A. HEINZ.
ELECTROLYTIC CONVERTER FOR THE TRANSFORMATION OF ALTERNATING CURRENTS INTO CONTINUOUS CURRENTS.
APPLICATION FILED OCT. 22, 1913.
1,097,801.
Patented May 26, 1914.
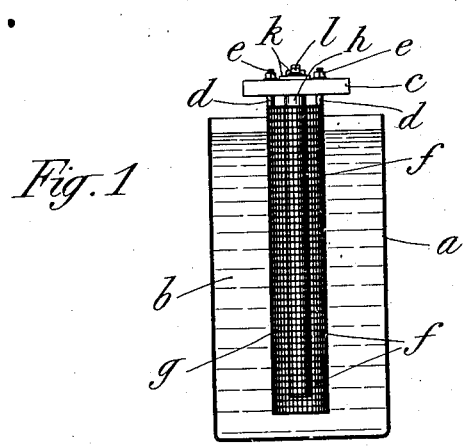
Fig. 1
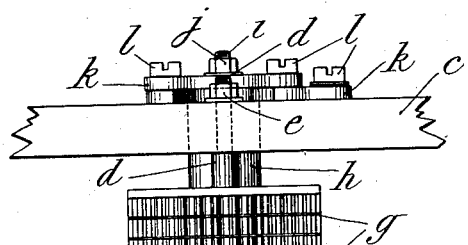
Fig. 2
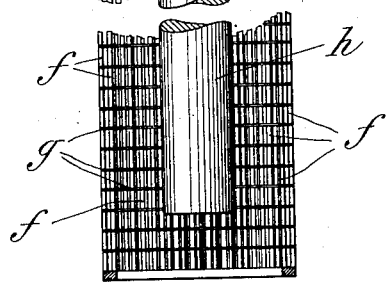
Fig. 3
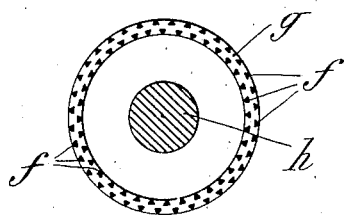
Witnesses:
B. V. Dommers
E. Leckert.
Inventor.
Alfred Heinz.
By Henry Ort Jr. Atty.

UNITED STATES PATENT OFFICE.

ALFRED HEINZ, OF PARIS, FRANCE.

ELECTROLYTIC CONVERTER FOR THE TRANSFORMATION OF ALTERNATING CURRENTS INTO CONTINUOUS CURRENTS.

1,097,801.  Specification of Letters Patent.  Patented May 26, 1914.

Application filed October 22, 1913. Serial No. 796,659.

*To all whom it may concern:*

Be it known that I, ALFRED HEINZ, citizen of the Republic of France, and residing at 2 Rue Tronchet, Paris, in the said Republic, engineer, have invented certain new and useful Improvements in Electrolytic Converters for the Transformation of Alternating Currents into Continuous Currents; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to an apparatus based on the property possessed by aluminium when it constitutes the electrode of a couple arranged in an electrolytic vat, and which property was discovered in 1857 by Buff. The phenomenon noticed is as follows: When a current is caused to pass through an electrolytic vat the electrodes of which are one of aluminium and the other of lead, it is found that the current passes freely when the aluminium electrode is the cathode (negative pole) and, on the contrary, that the current is obstructed when the aluminium is the anode (positive pole). In order that an apparatus so composed may operate in a continuous manner, it is necessary for the electrolyte to constantly circulate around the electrodes; if not, polarization and clogging ensue and interrupt the operation.

The arrangement forming the subject of this invention has for its object to insure a constant displacement of the whole mass of liquid from the surface of the electrodes and not a simple up and down movement of such liquid. For this purpose, the converter of the present system is composed essentially of a receptacle containing the electrolyte, in which is immersed a circular electrode of lead alloyed with antimony, which is itself composed of a multitude of small open cells, of special form, distributed over the entire surface of the electrode; in the central space of this electrode is arranged a cylinder of aluminium constituting the second pole of the couple. It will be understood, that on a current passing through the system, a gaseous disengagement will occur on the surface of the lead electrode, which will produce an immediate displacement of the electrolyte through the cells, so that the liquid surrounding the aluminium will be caused to be displaced and constantly renewed over the entire surface, and that in a direction perpendicular to the diameter. No polarization can therefore occur and the converter will operate in a continuous manner. The temperature of the electrolyte will moreover be uniform throughout the mass, owing to the ready diffusion through the cells.

The accompanying drawing illustrates the detail of a converter constructed according to this invention.

Figure 1 is a vertical section of such apparatus, taken through the vat containing the electrodes and the electrolyte. Fig. 2 is an elevation of the two concentric electrodes, the outer annular electrode being partly broken away in order to show the central electrode more clearly; Fig. 3 is a horizontal section of these two electrodes.

As will be seen in the drawing, into the vat $a$ containing the electrolyte $b$, the two electrodes are immersed being suitably supported by or suspended from the exterior supporting plates $c$, which, in the case of a battery composed of several elements, will conveniently be common to the whole of same. The outer annular electrode, which is fixed to this plate $c$ by means of screw-threaded extensions $d$ fitted with nuts $e$, is composed of a double grating, of lead alloyed with antimony, the vertical bars $f$ of which are preferably of triangular section (see Fig. 3), while the horizontal bars $g$ may conveniently be in the form of flat circular rings (see Fig. 2). The whole constitutes a multitude of small cells, open on their two faces, through which the circulation of the liquid occurs. It will be readily understood that this cellular lead electrode may be entirely submerged in the electrolyte $b$ and that when so submerged its construction will of itself insure that the displacement and the circulation of the liquid shall occur through the cells. The central electrode is composed of a cylinder of aluminium $h$, which is arranged in the interior of the annular electrode $f$, $g$, and which is also fixed to the supporting plate $c$ by a screw threaded extension $i$ fitted with a nut $j$. Connection bars $k$ provided with terminals $l$ and arranged on the plate $c$, permit of the ready connection of the electrodes to the electric circuit in which the apparatus is included.

It will be readily understood that instead of circular cylindrical electrodes, flat or other suitable form of electrodes might be employed.

What I claim as my invention, and desire to secure by Letters Patent, is:—

1. An electrolytic converter for the transformation of alternating currents into continuous currents; comprising a receptacle, two electrodes therein, one of which is of aluminium and the other containing lead and comprising two sets of bars spaced apart and flat strips connecting all the bars at intervals along their length, thereby forming a cellular electrode through which an electrolyte is free to circulate.

2. An electrolytic converter for the transformation of alternating currents into continuous currents; comprising a receptacle, an electrolyte therein, and two concentric electrodes one of aluminium and the other of a lead alloy having two concentric sets of vertical bars held spaced apart by flat horizontal bars forming multiple open cells.

3. An electrolytic converter for the transformation of alternating currents into continuous currents, comprising: an electrolyte receptacle, a central electrode of aluminium arranged in this receptacle; a peripheral electrode surrounding the former and composed of two slightly separated gratings, the bars of one of which overlap the spaces of the other; and a liquid electrolyte contained in this receptacle.

4. An electrolytic converter for the transformation of alternating currents into continuous currents, comprising: an electrolyte receptacle; a central electrode of aluminium, arranged in this receptacle; a peripheral electrode surrounding the former and composed of two series of vertical alternating triangular bars, the bases of which face each other and which are maintained slightly separated by horizontal flat annular bars; and a liquid electrolyte contained in the said receptacle.

In testimony that I claim the foregoing as my invention, I have signed my name in presence of two subscribing witnesses.

ALFRED HEINZ.

Witnesses:
HANSON C. COXE,
ALCIDE FABE.